Jan. 18, 1966  R. J. MELTZER  3,229,564
REFLECTOMETER
Filed May 12, 1961

INVENTOR.
ROBERT J. MELTZER
BY Frank C. Parker
David E. Dougherty
ATTORNEYS

United States Patent Office 3,229,564
Patented Jan. 18, 1966

3,229,564
REFLECTOMETER
Robert J. Meltzer, Irondequoit, N.Y., assignor to Bausch & Lomb Incorporated, Rochester, N.Y., a corporation of New York
Filed May 12, 1961, Ser. No. 109,612
3 Claims. (Cl. 88—14)

This invention relates to a novel surface finish reflectometer, and more particularly to a novel surface finish reflectometer which indicates relatively small changes in the reflectivity of high quality surface finishes.

A device according to the present invention is responsive to changes in the ratio of specularly and diffusely reflected light; however, it is relatively insensitive to changes in color or changes in the intensity of the primary light source caused by ordinary line voltage variations. The device described herein incorporates a novel objective lens system. The use of the novel objective lens system overcomes to a high degree the limitations of previous reflectometers. For example, the present device does not require a wide acceptance angle for differentiating between specularly and diffusely reflected light.

The structure according to the invention is relatively compact and allows for surface measurements to be made on objects where only limited areas are accessible for such measurement. The device is of relatively small size, is relatively inexpensive to manufacture, is durable in service, and is adaptable for use under varying conditions.

Briefly, the device comprises a light source and means for imaging light onto a specimen surface. The imaging means is operative to direct specularly reflected light rays from the specimen surface onto a first photosensor. A substantial portion of the light which is not directed to the first photosensor, that is, the diffusely reflected light, is directed to a second photosensor. The ratio of the electrical signals produced by the respective photosensors in response to the intensity of light impinging on the respective photosensors constitutes an indication of the surface finish. Since a relatively rough surface diffuses light more than a relatively smooth surface, the intensity of the light reaching the first photosensor will be less for a relatively rough surface. Accordingly, changes in the ratio of the values of the two photosensors would indicate changes in the specimen surface.

Figure 1:
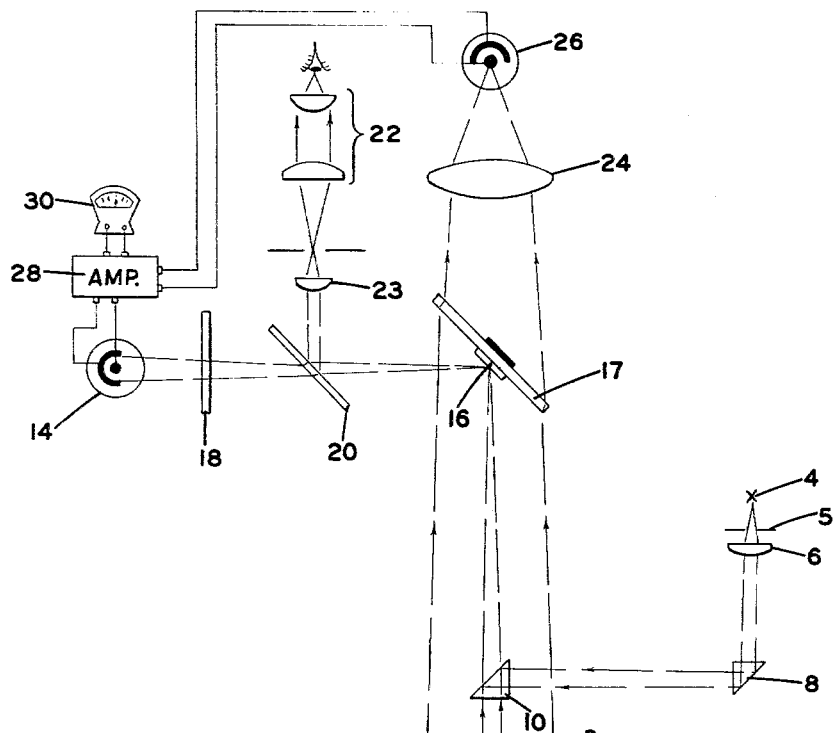
Figure 2:
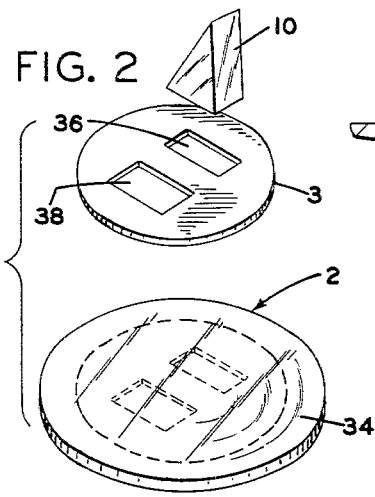

The invention will now be described in detail in connection with the accompanying drawings in which:

FIG. 1 is a schematic diagram illustrating a surface finish reflectometer according to the invention; and FIG. 2 is a perspective view illustrating the objective lens system incorporated in the device shown in FIG. 1.

The reflectometer according to the invention incorporates an objective lens 2. The objective lens 2 is arranged to image an illuminated slit 5 on a specimen surface 12. The slit 5 is illuminated by a light source 4 which may be a conventional tungsten filament lamp. A condenser lens 6 and a pair of reflecting prisms 8 and 10 are arranged in conjunction with the light source 4 and the objective lens 2 for imaging the slit 5 on the specimen surface 12. The arrangement of the reflecting prisms 8 and 10 is such, that light is directed toward the surface to be examined, through one of two apertures in a mask 3, and is imaged by the objective lens 2 on the specimen surface 12. The prism 10 also acts as an aperture stop for the objective lens 2.

The objective lens 2 shown more clearly in FIG. 2 has the mask 3 placed thereon to cover a central portion of the lens 2. The mask 3 has the apertures 36 and 38 therein. The aperture 36 is arranged directly below the reflecting prism 10 and allows for the slit 5 to be imaged by that portion of the lens 2.

The specularly reflected light from the image is imaged by the objective lens 2 through the aperture 38 onto an aluminized spot 16. The aluminized spot 16 is formed of an inclined pellicle 17. The spot 16 reflects the specularly reflected light to a first photosensor 14. A substantial portion of diffusely reflected light is directed by a peripheral transmissive portion 34 of the lens 2 through the outer portion of the pellicle 17 and through a field lens 24 to a second photosensor 26.

Means such as an amplifier output circuit 28 are connected to an indicator 30 to indicate the ratio of the light intensity of the diffusely reflected light directed onto the photosensor 26, and the intensity of the specularly reflected light directed onto the photosensor 14. The indicator 30 indicates the ratio of the electrical signals produced by the photosensor 14 and the photosensor 26. The ratio is an indication of the surface finish.

A beam splitter 20 may be placed in the ray path for directing a portion of the light through a field lens 23 to an eyepiece 22 so that an operator may examine the specimen surface 12. Also an attenuating filter 18 is preferably placed in front of the photosensor 14, and with the beam splitter 20, may be used to reduce the intensity of the specularly reflected light impinging on the photosensor 14. The use of the filter 18 is desirable to reduce the intensity of the specularly reflected light when the specularly reflected light is of greater intensity than the diffusely reflected light, i.e. when a specimen surface has a reflective finish. Generally the intensity of the specularly reflected light will be reduced before it impinges on the photosensor 14, to approximately the intensity of the diffusely reflected light reaching the photosensor 26.

In operation the device may be initially adjusted to a standard surface by inserting the filter 18 in the ray path so that the output of the photosensors 14 and 26 are equal to a reference value or to each other. After the initial adjustment the indicator 30 will show a null reading or a predetermined value. A change in the ratio of the light intensities from a predetermined value caused, for example, by an increase in the intensity of the diffusely reflected light, or a decrease in the intensity of the specularly reflected light, will be indicated by a change in the electrical output of the photosensor 26 with respect to the photosensor 14, and will indicate a change in the reflectivity of the specimen surface 12.

Since the single light source 4 projects light onto the specimen surface 12, the ratio of the specularly reflected light to the diffusely reflected light is relatively unaffected by changes in the intensity of the light source 4. Changes in the intensity of the light source 4 have approximately the same effect on the diffusely reflected light and the specularly reflected light. Therefore the ratio measuring device is relatively unaffected by ordinary line voltage variations.

The mask 3 has the apertures 36 and 38 therein, the aperture 38 is slightly larger than the aperture 36. The smaller aperture 36 is covered by the prism 10 and the larger aperture 38 allows small departures from perpendicularity during the use of the device without decreasing the amount of light reaching the respective photosensors.

The transmissive portion 34 of the lens 2 directs the diffusely reflected light to its respective photosensor. The masked portion of the objective lens 2 acts in conjunction with the prism 10 as an aperture stop for directing light from the light source 4 onto the specimen surface 12 and also prevents specularly reflected light rays from being impinged on the photosensor 26. The inclined pellicle 17 may be a single mirror or may comprise a film which has been selectively coated to provide a transmissive and a reflective portion.

What is claimed is:

1. A reflectometer comprising a slit, a light source for illuminating said slit, and an optical system including an objective lens for imaging said slit upon a specimen surface in a plane relatively close to said objective lens whereby the slit imaging light is partly specularly and partly diffusely reflected from the specimen surface, a first photosensor, a second photosensor, and a pellicle, said pellicle including a reflective portion separating specularly and diffusely reflected light, a first selected portion of said objective lens retrodirecting the specularly reflected light from the specimen surface toward said pellicle and the reflective portion of said pellicle directing the retrodirected specularly reflected light on to said first photosensor, a second selected portion of said objective lens retrodirecting diffusely reflected light on to said second photosensor, a mask disposed on said objective lens excluding specularly reflected light from said second photosensor, and indicating means responsive to the output of said photosensors.

2. A reflectometer comprising a slit, and a light source for illuminating said slit, an optical system including an objective lens for imaging said slit upon a specimen surface in a plane relatively close to said objective lens whereby the slit imaging light is partly specularly and partly diffusely reflected from the specimen surface, a first photosensor, a second photosensor, and a pellicle, said pellicle including a reflective coating on its central portion and a transmissive peripheral portion, a first selected portion of said objective lens retrodirecting specularly reflected light and said reflective portion of said pellicle directing specularly reflected light on to said first photosenor, a second selected portion of said objective lens retrodirecting diffusely reflected light through said transmissive portion of said pellicle and on to said second photosensor, a mask disposed on said objective lens excluding specularly reflected light from said second photosensor, and indicating means responsive to the output of said photosensors.

3. A reflectometer according to claim 2 which includes means for visibly monitoring the specimen surface.

References Cited by the Examiner
UNITED STATES PATENTS

| 2,604,809 | 7/1952 | Mitchell | 88—14 |
| 3,017,515 | 1/1962 | Welch | 88—1 X |
| 3,081,665 | 3/1963 | Griss et al. | 88—14 |

FOREIGN PATENTS

| 466,114 | 6/1950 | Canada. |
| 679,547 | 8/1939 | Germany. |

OTHER REFERENCES

Becker: Methods of Measurement and Definition of Surfaces; published in Microtechnic, volume IV, No. 5, page 276 only, September through October 1950.

JEWELL H. PEDERSEN, *Primary Examiner.*

EMIL G. ANDERSON, *Examiner.*